June 13, 1967  R. W. ENZ  3,325,217
TUNNELING AND EXCAVATION THROUGH ROCK BY
CORE FORMING AND REMOVAL
Filed Dec. 16, 1964  12 Sheets-Sheet 1

INVENTOR.
ROBERT W. ENZ
BY Oldham & Oldham
ATTORNEYS

June 13, 1967

R. W. ENZ 3,325,217

TUNNELING AND EXCAVATION THROUGH ROCK BY CORE FORMING AND REMOVAL

Filed Dec. 16, 1964

INVENTOR.
ROBERT W. ENZ
BY
Oldham & Oldham
ATTORNEYS

INVENTOR.
ROBERT W. ENZ

INVENTOR.
ROBERT W. ENZ
BY
Oldham & Oldham
ATTORNEYS

INVENTOR.
ROBERT W. ENZ
BY Oldham & Oldham
ATTORNEYS

June 13, 1967  R. W. ENZ  3,325,217
TUNNELING AND EXCAVATION THROUGH ROCK BY
CORE FORMING AND REMOVAL
Filed Dec. 16, 1964  12 Sheets-Sheet 12

INVENTOR
ROBERT W. ENZ
BY Oldham & Oldham
ATTORNEYS

United States Patent Office 3,325,217
Patented June 13, 1967

3,325,217
TUNNELING AND EXCAVATION THROUGH ROCK BY CORE FORMING AND REMOVAL
Robert W. Enz, Aztec, N. Mex., assignor to Karl A. Enz, Tokyo, Japan
Filed Dec. 16, 1964, Ser. No. 418,676
Claims priority, application Japan, Dec. 28, 1963, 38/71,092
12 Claims. (Cl. 299—31)

This invention relates generally to methods of and apparatus for excavating tunnels through rock and has for its object to provide an improved method of excavating cylindrical tunnels through soft or solid rock for mining and other purposes.

Another object of the present invention is to provide a method of rock excavation of the sort described which employs mechanical power including electric, hydraulic, or other motor means for safe and continuous excavation.

A further object of the present invention is to provide an apparatus for rock excavation designed to carry out the improved method of the invention.

Apparatus for excavating tunnels through rock has previously been proposed which includes a circular disk carrying a multiplicity of rock cutters thereon and adapted to be turned while being forced against the rock face. This type of apparatus, however, has been deficient in necessitating very much labor, time and power since it works for full-face operation, breaking off the entire face of the tunnel.

The present invention proposes to excavate tunnels by continuously digging the tunnel face in a manner so as to form an annular drift or trench of a definite radial width, leaving a cylindrical core of rock, and hauling out the latter rearwardly each time when the annular drift reaches an appropriate depth. Thus, according to the present invention, a tunnel is not bored out full-face but is bored only over an annular portion of the face leaving a cylindrical core, which breaks off under gravity into lumps or fragments depending upon the rock type. The lumps or fragments of rock thus formed are removed from the face with or without the aid of scraper means. It will be appreciated, therefore, that tunnels can be excavated efficiently in a minium of operation time and power and also with safety.

For a better understanding of the present invention, reference should be made to the accompanying drawings, in which:

FIGS. 1A, 1B and 2 illustrate the principles of the invention; FIG. 1A representing a diagrammatic axial cross-sectional view of a tunnel hole being excavated according to the method of the present invention; FIG. 1B representing a view similar to FIG. 1A illustrating a modified form of tunnel hole being excavated with its forward end face conically inclined; and FIG. 2 representing a cross-sectional view taken along the line II—II in FIG. 1A or 1B;

Figure 1A:
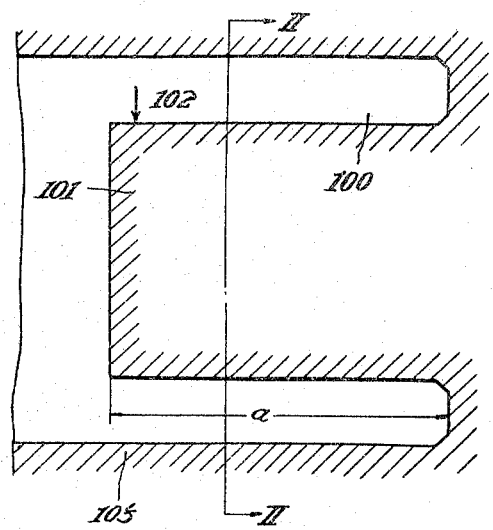
Figure 2:
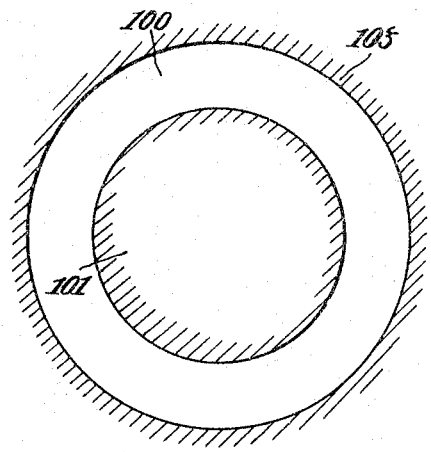

First, it is to be understood that holes in the form shown in FIGS. 1A and 2 are to be excavated by the apparatus shown in FIGS. 3 to 8. First, an annular drift or trench 100 having a definite radial width is dug in the rock 103 until it reaches a proper depth $a$, when the cylindrical core 101 of rock left inside the annular drift breaks down off the face under gravity substantially along its bottom plane so that the excavation operation can be performed advantageously while hauling out the broken rock by conveyor means such as of the roller or belt type.

In cases where the cylindrical core 101 does not break off the face as described even after it has reached a predetermined length, it can be positively broken off along its bottom face by applying proper external force to a position of the cylindrical core close to its rear end in the direction of the arrow 102, for example, by hydraulic jack means.

Figure 3:
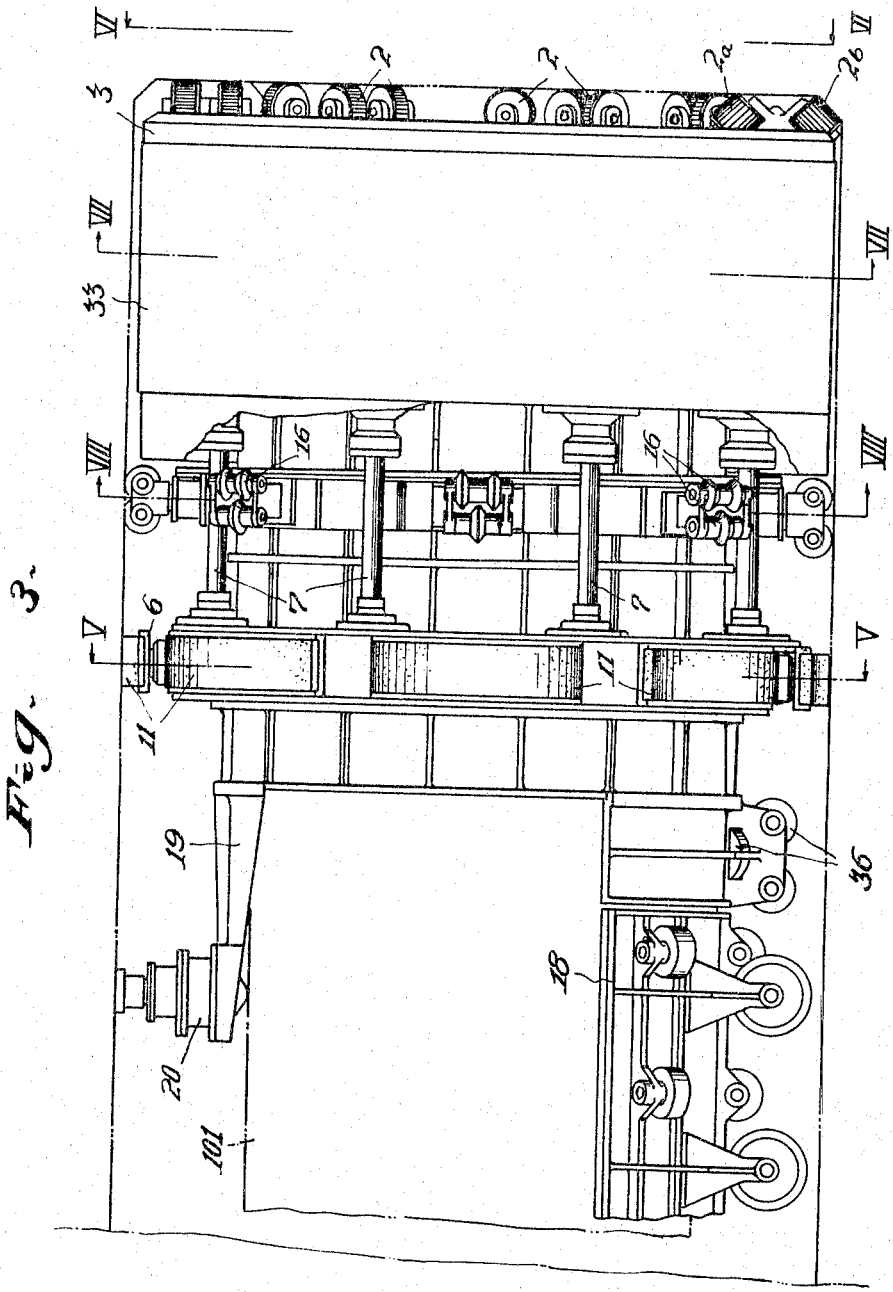
FIG. 3 is a side elevational view, partially broken away, of an excavating apparatus embodying the present invention.
Figure 4:
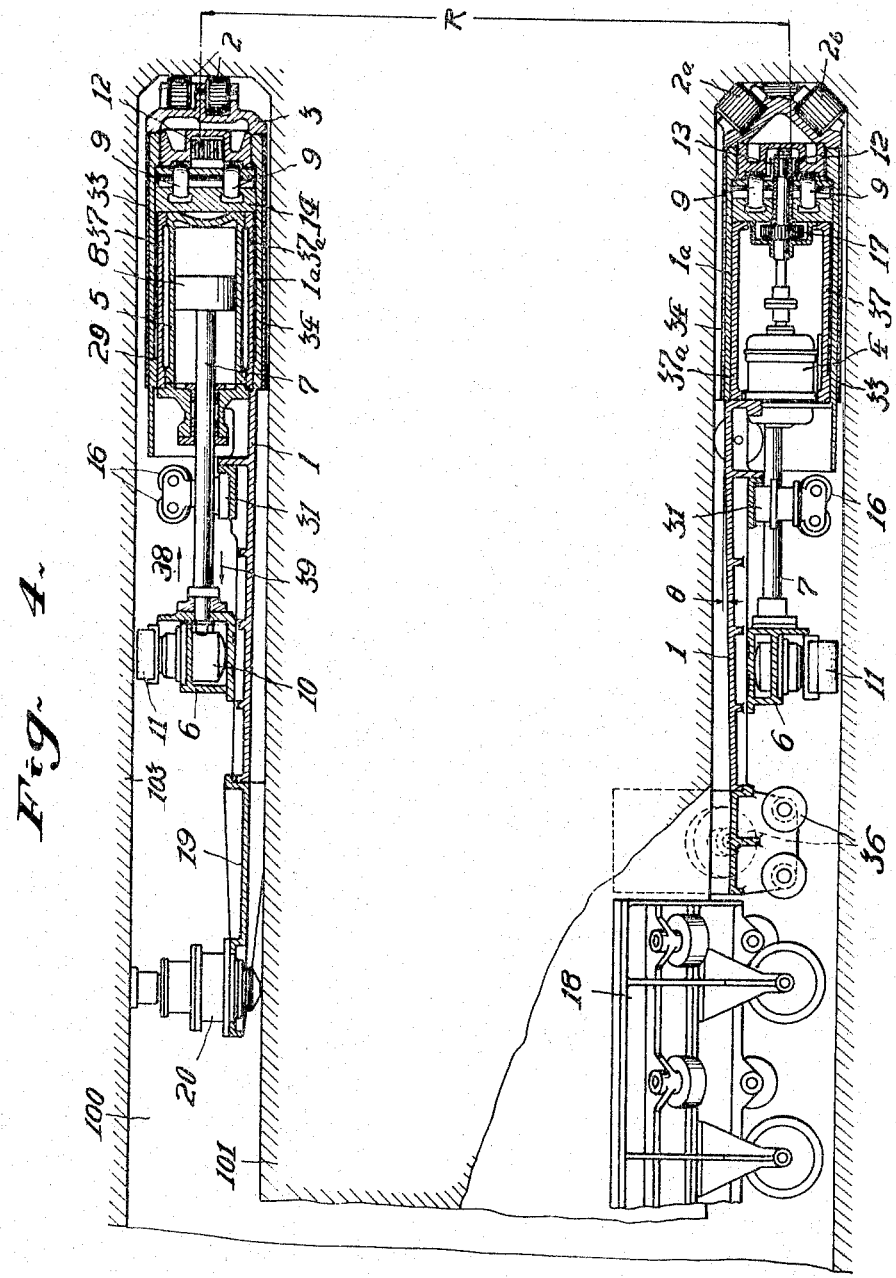
FIG. 4 is an axial cross-sectional elevation of the apparatus shown in FIG. 3.

Description will next be made on the essential parts of the rock excavating apparatus of the present invention with reference to FIG. 3, illustrating the external appearance of the apparatus, and to FIG. 4, representing an axial cross-sectional elevation of same.

A first tubular frame 1–1A includes an annular rotary support 3 carrying a plurality of rock cutters 2 and drive means 4 rotating the support 3. A plurality of hydraulic cylinders 5, mounted between outer cylindrical frame 37 and inner cylindrical frame 37a are secured to the forward section 1a of the first frame about its periphery for advancing the frame 1–1a with all of the members mounted thereon in the direction of excavation. Arranged concentrically with the first frame is a second tubular frame 6 which is a little larger in diameter and much reduced in length. The second frame 6 is connected with pistons 8, arranged within the respective cylinders 5, by way of rods 7.

The first frame 1–1a consists of two axially adjoining sections 1 and 1a and the forward section 1a is cylindrically shaped having the same diameter at its front and rear ends whereas the other or rearward frame section 1 is frustoconically having a diameter increasing rearwardly from the junction with the forward section 1a or having a taper angle of $\theta$, as shown in FIG. 4 of the drawings.

Figure 5:
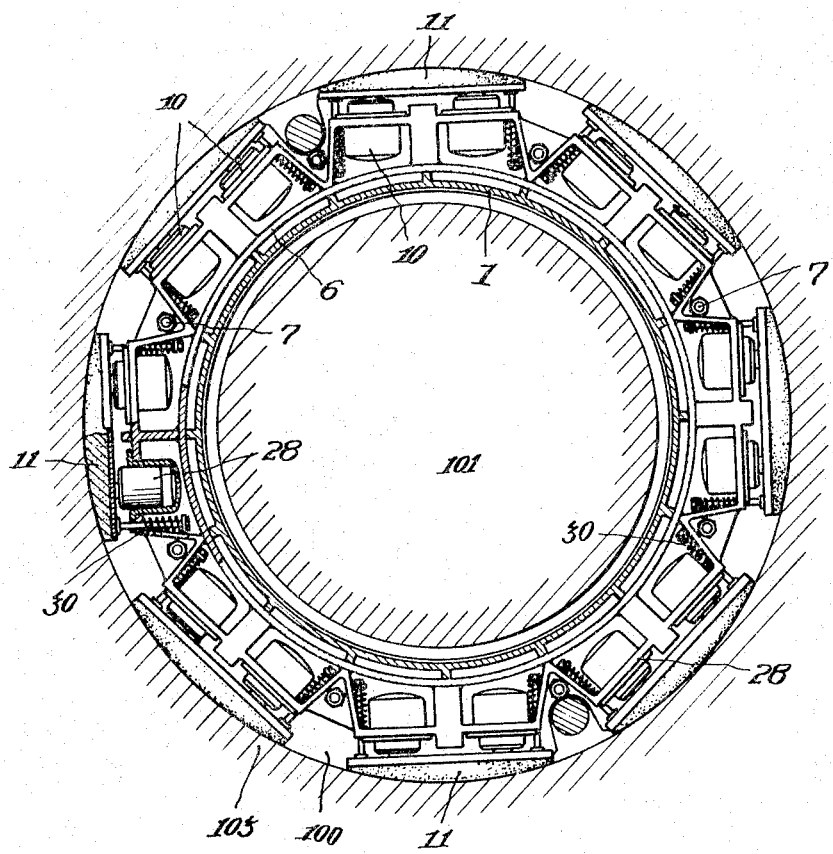
FIG. 5 is a cross-sectional view taken along the line V—V in FIG. 3.

Also, mounted on the periphery of the second frame 6 are a plurality of hydraulic cylinders 10, as clearly shown in FIG. 5, which illustrates the frame 6 in transverse cross section. Secured to pistons 28 arranged within the respective cylinders 10 are respective presser pads 11, which are radially movable. When the presser pads 11 are hydraulically forced radially outwardly against the resilience of springs means 30 so as to be firmly pressed against the wall of the excavated tunnel, substantial friction takes place between the wall surface and the presser pads 11 to hold the second frame 6 in position. When it is desired to displace the frame 6, hydraulic cylinders 10 are first de-energized to allow the presser pads 11 to be disengaged from the wall 103 of the excavated hole 100.

The hydraulic cylinders 5 accommodating respective pistons 8 are each secured sidewise to the forward section 1a of the first frame and carry at their top a support 14 on which rollers 9 are slidably supported for the purpose of rotating the annular support 3 with rock cutters 2 thereon while forcefully driving it in the direction of excavation.

Secured to the surface of the annular rotary support 3 opposite to its surface carrying cutters 2 is an internal gear 12 of a diameter R which is in mesh with pinions 13 adapted to be driven from the drive means 4. Thus, rotary support 3 is rotated with rotation of pinions 13.

The drive means 4 are secured to the first frame section 1a like hydraulic cylinders 5 and may take any suitable form such as electric or hydraulic motors. For both hydraulic and electric motors, it is necessary to provide a reduction gear 17 between each of the motors and associated pinion 12. Hydraulic motors are preferable to facilitate speed control.

Figure 7:
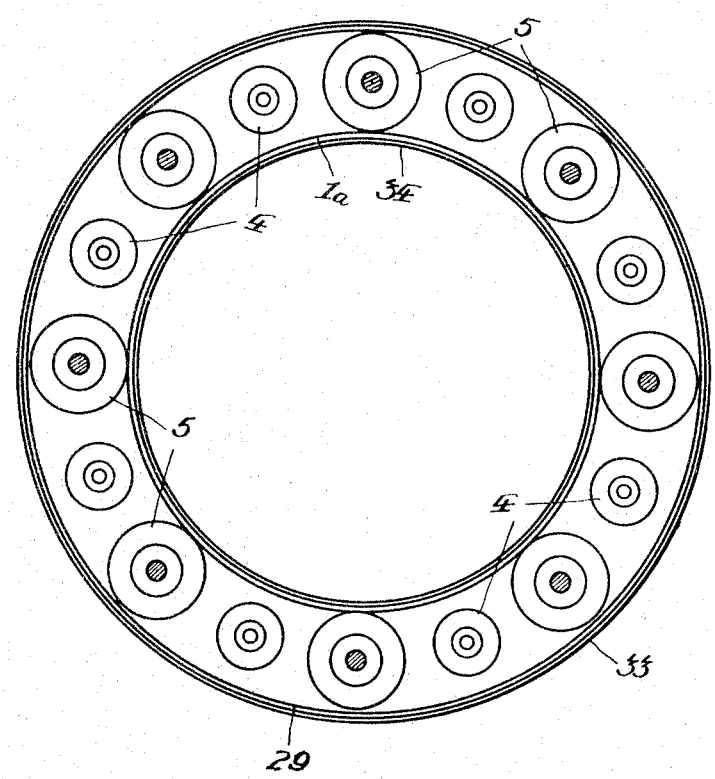
FIG. 7 is a cross-sectional view atken along the line VII—VII in FIG. 3.

As shown in FIG. 7, these drive means 4 and hydraulic cylinders 5 are arranged alternately with each other about the entire periphery of the frame section 1a, though the numbers of the drive motors and cylinders 5 may be freely determined taking into consideration the conditions in which they are used. For protection of the cylinders 5 and drive motors 4 an outer shell 29 is provided, on the periphery of which is secured a protecting shield 33, which is formed in readily detachable sections. A similar protecting shield 34 is arranged on the inside of the frame section 1a and also is formed in readily detachable sections.

Figure 6:
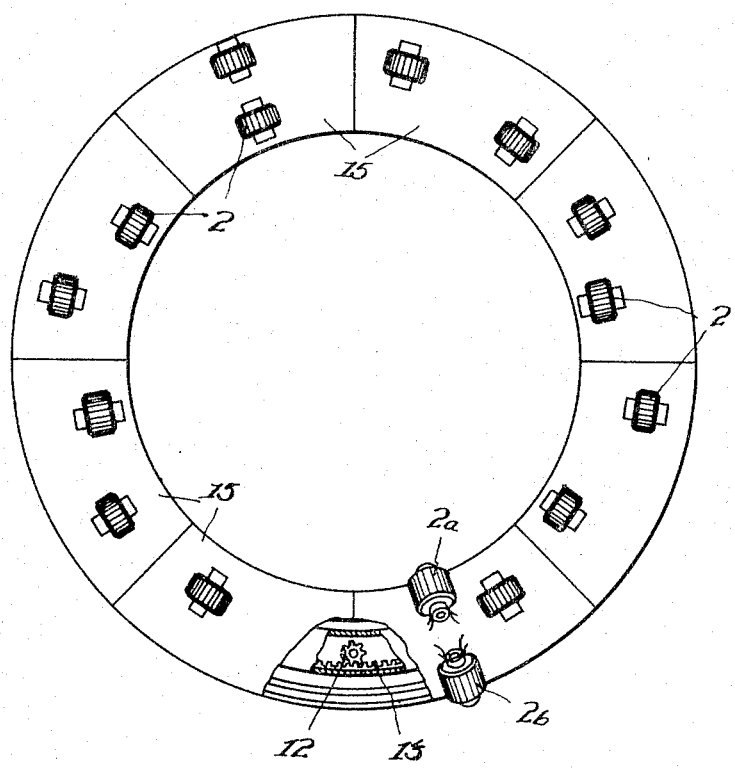
FIG. 6 is a front elevational view of the apparatus looking from the line VI—VI in FIG. 3.

The rock cutters 2 mounted on the annular rotary support 3 each take the form of a toothed wheel, for example, as shown in FIG. 4 and are arranged on a number of blocks 15, as clearly shown in the front elevation of FIG. 6, in positions successively differing between the adjacent blocks. This is for the purpose of distributing the excavating load uniformly over all of the cutters 2 during excavation in order that the face may be excavated uniformly over the entire area thereof as the rotary support 3 is driven to rotate. Some of the rock cutters, however, are mounted on the rotary support 3 so as to extend beyond either the inner or outer edge thereof as indicated at 2a and 2b, respectively, so that an annular bore hole or drift 100 may be formed which has a diameter slightly larger than that of the apparatus.

In order to enable use of rock cutters of the configuration conforming to the hardness, brittleness and other properties of the rock to be excavated, it is desirable to prepare blocks carrying cutters of different shapes ready for replacement.

Figure 8:
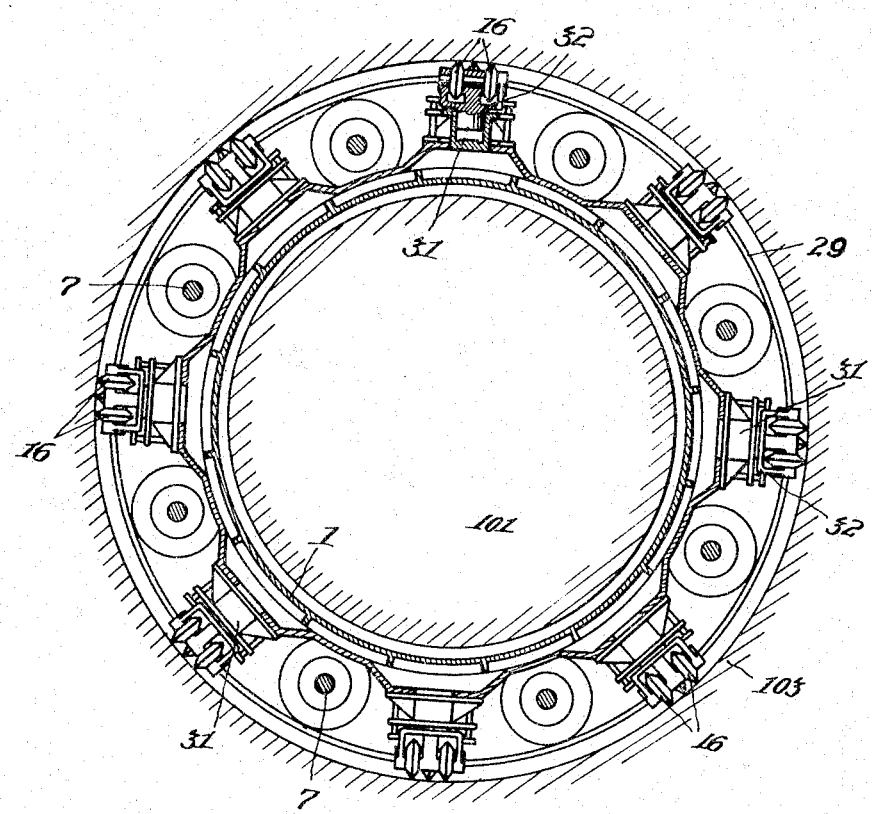
FIG. 8 is a view similar to FIG. 7, taken along the line VIII—VIII in FIG. 3.

As shown in the transverse cross-sectional view of FIG. 8, the rearward section 1 of the first frame has mounted on its periphery a plurality of hydraulic cylinders 31 which accommodate respective pistons 32 to each of which a plurality of rollers 16 are secured. These rollers 16 are slidable along the wall of the hole just bored and enable the first frame 1–1a to be shifted in a stable manner.

Referring to FIG. 4, a hydraulic double-acting jack 20 including a cylinder and a piston accommodated therein is carried by a bracket arm 19 secured to the top portion of the first frame section 1 at its rear end and serves to press the rock core 101 downwardly to break it off. In order that the broken rock may readily be carried to the exterior, rollers 36 are mounted on the bottom portion of the frame section 1 with a roller or belt conveyor 18 joined to the rear end of the frame section at its bottom.

Although not shown in the drawings, it is to be understood that means are provided which feed water from a suitable water supply source through conduits and rotary parts to the face being excavated for the purpose of cooling the rock cutters 2, effecting lubrication of the respective rotary parts and flushing the rock fragments formed during excavation to the rear.

Description will next be made on the operation of the excavating apparatus of the present invention.

First, the first frame 1–1a is advanced until the rock cutters 2 thereon are brought into engagement with the rock face to be excavated. Then the pistons 8 with their rods 7 are actuated in the direction of the arrow 38 in FIG. 4 and simultaneously the second frame 6 is displaced also in the direction of the arrow 38. Subsequently, hydraulic cylinders 10 arranged on the periphery of the second frame 6 are energized to force the presser pads 11 against the tunnel wall thereby to secure the second frame in position.

Following the above preliminary procedure, the hydraulic cylinders 31 mounted on the first frame 1 are controlled so as to hold the frame 1–1a at all times in axial alignment with the tunnel hole allowing the rollers 16 to slide along the wall thereof while on the other hand the hydraulic cylinders 5 are energized to actuate respective pistons 8 and rods 7 in the direction of the arrow 39 whereby the hydraulic cylinders 5 and the first frame 1–1a connected integrally therewith are moved in a direction 38 opposite to that indicated by the arrow 39.

Then the drive means 4 are started to rotate the rotary support 3 with rock cutters 2 mounted thereon while pressing the latter against the rock face to form an annular hole 100 therein. During excavation it is desirable to feed water from an appropriate water supply source through conduit means and rotary parts of the apparatus to the face being excavated for the purpose of cooling the cutters 2, lubricating the respective rotary parts and flushing the rock fragments formed during excavation rearwardly from the face. As excavation proceeds, the pistons 8 are brought to the rear stroke end, but the rotation of the rotary support 3 need not be interrupted, and the hydraulic cylinders 10, arranged on the periphery of the second frame 6, are exhausted to allow the presser pads 11 to be disengaged from the wall of the tunnel hole under the bias of compression springs 30. Then the second frame 6 is moved in the direction of the arrow 38 as far as allowed by the stroke of the pistons 8 and the presser pads 11 are again firmly pressed against the wall of the tunnel hole to hold the second frame 6 in place. Now the entire apparatus is ready to repeat the excavating operation described hereinabove. In this manner, an annular bore 100 as illustrated in FIG. 1A is progressively formed leaving a cylindrical core of rock 101 inside of the first frame 1–1a. In no time the cylindrical core 101 breaks off from the face under gravity at its base end and is hauled rearwardly or exteriorly of the tunnel by means of the conveyor 18. Where the cylindrical core 101 of rock is too hard to break off under gravity alone, the hydraulic jacks 20 should be operated to positively break off the core at its base end so that it may subsequently be carried out of the tunnel.

As will readily be noted, a straight tunnel can be excavated simply by repetition of the above procedure. To drive a curved tunnel substantially the same procedure can be employed except that the hydraulic cylinders 31 and pistons 32 should be operated in a different manner. In other words, any curved tunnel can be driven simply by varying the oil feed to the hydraulic cylinders 31 from each other between any two diametrically oppositely arranged ones depending upon the direction in which the tunnel is to be curved thereby to deviate the axes of the first and second frames from each other by an appropriate amount. In driving a curved tunnel, the entire apparatus must apparently be turned to a more or less extent in an appropriate direction in the interior of the tunnel excavated. Taking this into consideration, the rearward section 1 of the first frame is shaped frusto-conically and some of the rock cutters are mounted on the rotary support 3 to extend radially beyond either the inner or outer edge thereof so that an annular bore 100 may be formed which is slightly larger in size than the rotary support 3, as described hereinbefore.

Figure 1B:
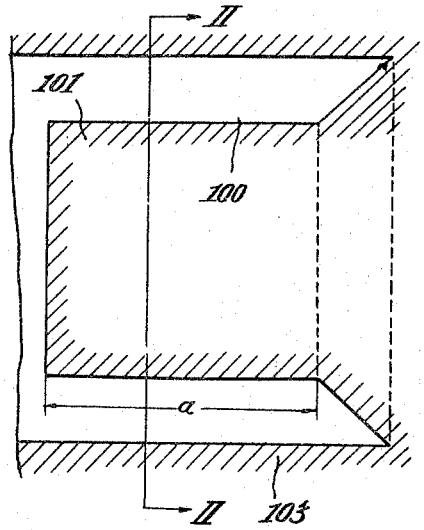

Next, the apparatus shown in FIGS. 9, 10 and 11A or 11B will be described which is advantageously employed to drive tunnels in the form shown in FIG. 1B.

Figure 9:
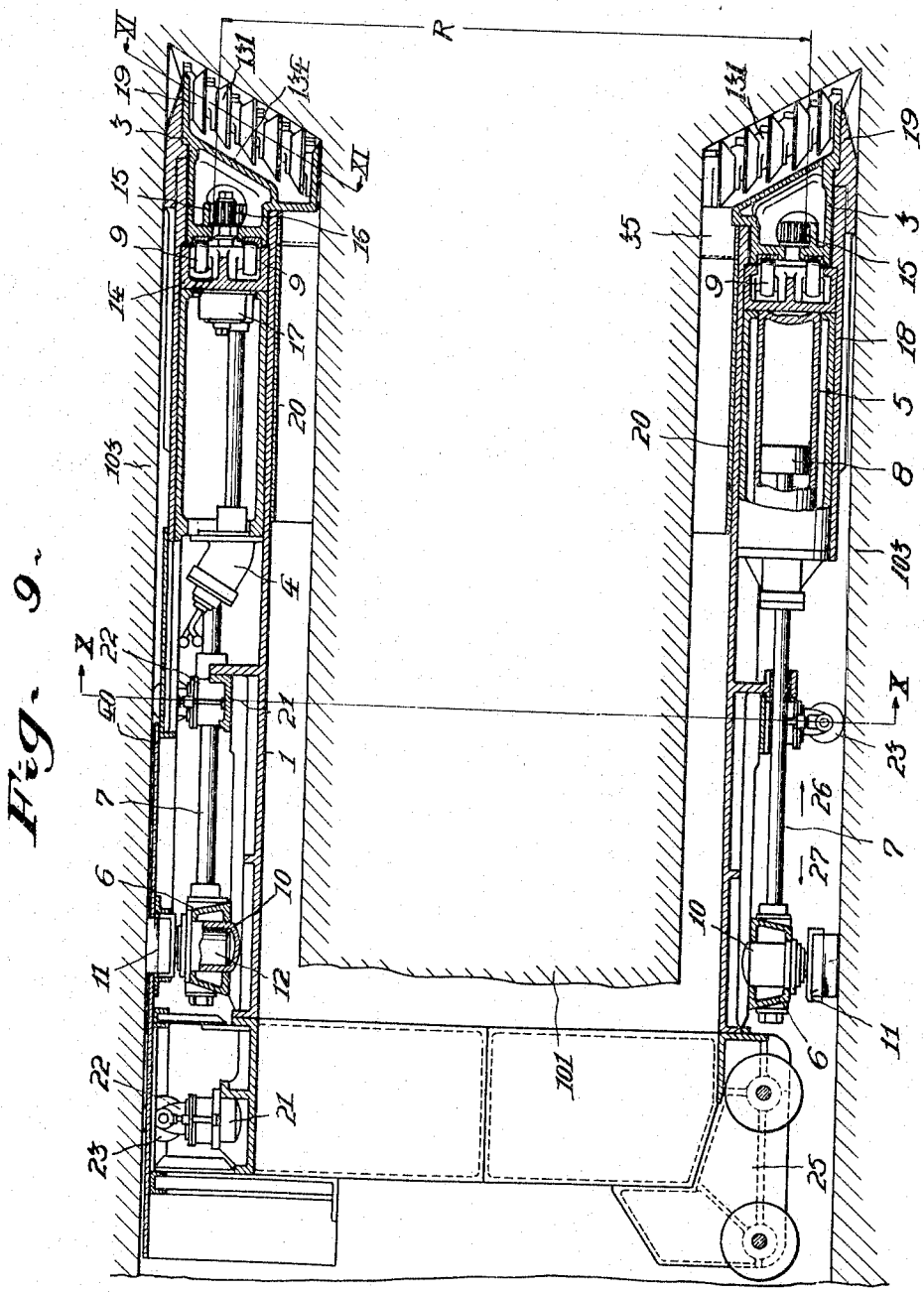
FIG. 9 is an axial cross-sectional elevation of another embodiment of the present invention adapted to excavate tunnels in the form illustrated in FIG. 1B.

Referring first to FIG. 9, the apparatus principally comprises a first tubular frame 1 which includes an annular rotary support 3 having a funnel-shaped slope on which a multiplicity of rock cutters 134 and blades 133 (FIGS. 11A and 11B) are mounted and drive means 4 for turning the rotary support 3. Mounted on the periphery of the first frame 1 are a plurality of cylinders 5 which serve to advance the first frame 1 and all members arranged thereon in the direction of excavation. Also, a second tubular frame 6, having a limited axial length and a diameter slightly larger than the first frame, is arranged concentrically with the latter for sliding movement relative thereto. The second frame 6 is connected with the pistons 8 accommodated in the respective cylinders 5 by way of rods 7.

Secured to the periphery of the second frame 6 are a plurality of hydraulic cylinders 10, which accommodate respective pistons 12 each carrying a presser pad 11. Arranged between each of the cylinders 10 and associated presser pad 11 are spring means which bias the presser pads 11 radially inwardly of the frame 6. This function may also be accomplished hydraulically by differential piston.

On the top portions of the cylinders 5 arranged on the periphery of the first frame 1 is mounted a roller support 14 on which a plurality of rollers 9 are slidably supported. These rollers 9 are provided to forcefully drive the annular rotary support 3, in which are incorporated ball races, with rock cutters, 134 and curved blades 33 and 35 secured thereto, in the direction of excavation while allowing rotation of the rotary support 3.

An internal gear 15 having a diameter R is secured to the face of the annular rotary support 3 which is opposite its face carrying rock cutters 134 and blades 133. The internal gear 15 is in mesh with pinions 16 connected with rotary shafts of the drive means 4 so that the rotary support 3 can be rotated by the drive means 4 through the internal gear 15 and pinions 16.

The drive means 4 are mounted on the periphery of the first frame 1 like hydraulic cylinders 5 and may take the form of electric or hydraulic motors.

Figures 11A, 11B:
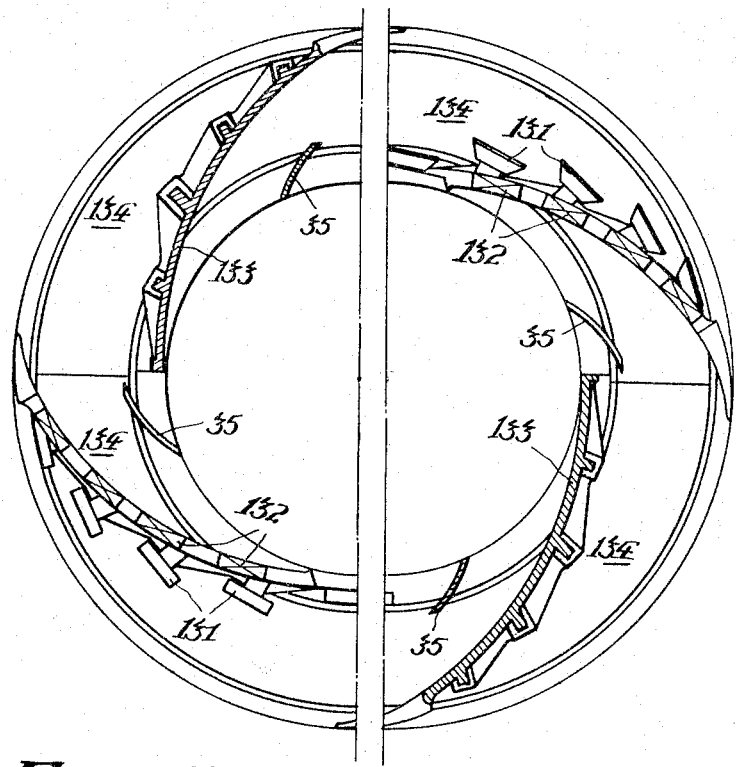
FIG. 11A is a cross-sectional view taken along the line XI—XI in FIG. 9.
FIG. 11B is a view similar to FIG. 11A, showing a modification of the apparatus of FIG. 9.
Figure 12:
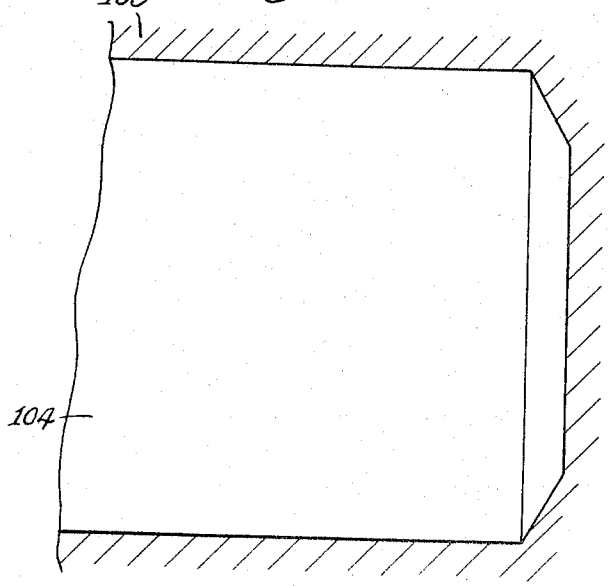
FIG. 12 is a view similar to FIG. 1A, diagrammatically illustrating the tunnel hole as bored in relatively soft ground.

As shown in FIG. 11A or 11B, rock cutters 131 are mounted on the funnel-shaped slope of the annular rotary support 3 and each include a scraper 132 and a rotary breaker both secured to the tip of the associated curved blade 133. Upon rotation of the roatary support 3, first the scrapers 132 bore the rock face to form multiple concentric grooves therein and subsequently the land portions remaining between the adjacent annular grooves are crushed down by the rotary breakers. Alternatively, the scrapers 132 engaging the rock face may form multiple concentric steps therein, which can subsequently be leveled by the rotary breakers 131.

It is highly desirable in practice to have rock cutters 134 in stock in different shapes and sizes, for example, as illustrated in FIGS. 11A and 11B so that the rock cutters 134 may readily be interchanged according to the rock type as the scrapers 132 and breakers 131 should vary in shape as well as in size according to the hardness, brittleness and other physical qualities of the rock to be bored, as will be apparent to those skilled in the art. For example, the rock cutters 131 shown in FIG. 11A are suited to excavation in relatively hard rocks and those shown in FIG. 11B are suitable for relatively brittle rocks.

In addition to rock cutters 131 described above, blades 133 and 35 of curved configuration are provided on the annular rotary support 3. The blades 133 serve to collect the rock fragments formed during excavation toward the center of the rotary support 3 while the blades 35 act to push the rock fragments, collected in the central portion of the rotary support, into the interior of the first frame 1 and toward the conveyor means 25.

This appratus can be protected by a curved roof-like cover 40, shown on FIG. 9. This cover is in two parts, the first part is attached to frame 1, while the second part is attached to presusre pads 11 forming a cover at all times against falling rock fragments and loose earth. This arrangement permits lining the tunnel close up to the advancing apparatus.

Figure 10:
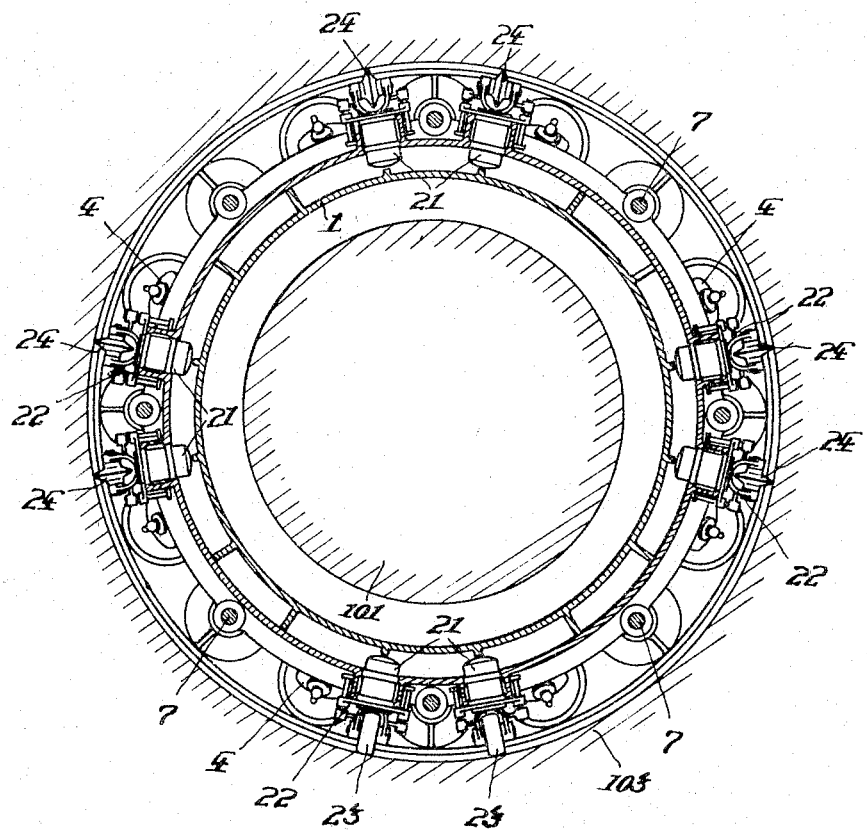
FIG. 10 is a cross-sectional view taken along the line X—X in FIG. 9.

As shown in FIG. 10, a plurality of hydraulic cylinders 21 are mounted on the periphery of the first frame 1 and accommodate respective pistons 22, each of which carries a plurality of rollers 23 and 24.

Figure 13:
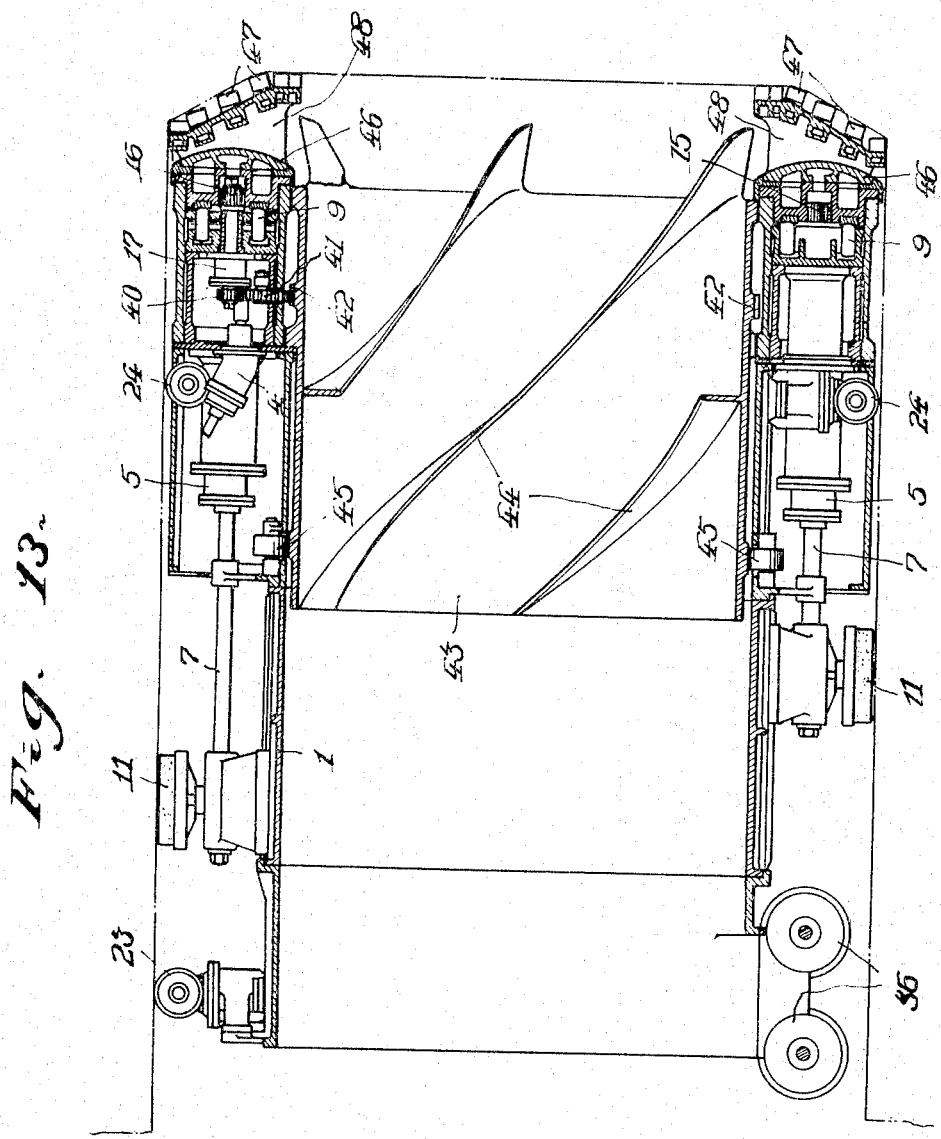
FIG. 13 is a view similar to FIG. 9, illustrating a further embodiment of the present invention adapted to excavate holes in the form shown in FIG. 12.
Figure 14:
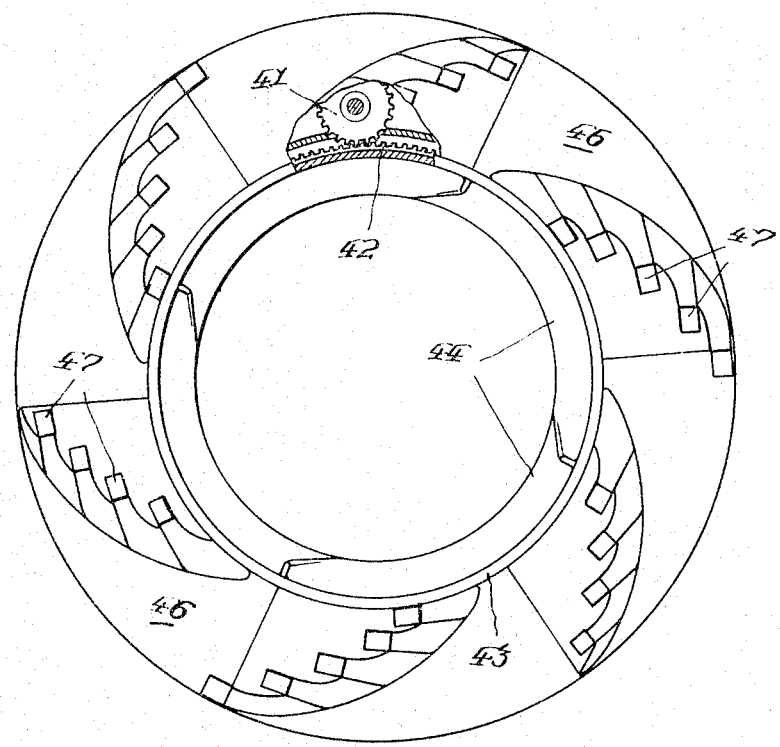
FIG. 14 is an end elevation, partly broken away, of the preferred embodiment of the invention shown in FIGURE 13.

The rollers 23 and 24 are slidable along the wall of the tunnel hole excavated in the direction of excavation enabling the first frame 1 to be displaced in a stable manner. Particularly, rollers 23 serve principally to support the weight of the first frame 1 while rollers 24 each having a sharp protruding peripheral edge, not only serve to support the first frame in stable position but also firmly engage the wall of the tunnel hole being excavated to sustain the reaction of the first frame occurring with rotation of the rotary support 3.

Where excavation is to be made in relatively soft rock or ground such as ordinary soil, a modified form of apparatus as shown in FIGS. 13 and 14 is preferred which operates to form a cylindrical hole 104 in the ground 103.

The apparatus comprises a frame 1, a cutter drive mechanism and a mechanism for releasably driving presser pads 11 against the tunnel wall, all of which components are substantially similar to those described hereinbefore in conjunction with FIGS. 3 to 11. However, the construction and arrangement of rock cutters on this modified apparatus are different from those of the preceding embodiments. Also it has a different scraper mechanism for scraping out earth or rock fragments rearwardly of the apparatus as they are formed therein from the annular face being bored by the cutters and the remaining core of rock.

As shown in FIG. 14, the apparatus has an annular rotary cutter support formed in segments 46 each of which is formed on its conical face a cutter having a number of teeth arranged in a curved configuration so as to project forwardly to an extent increasing from the outer to the inner periphery of the face.

Referring again to FIG. 14 and also to FIG. 13, a tubular scraper 43 is fitted inside of the cylindrical frame 1a for the purpose of scraping out rock fragments. As shown a plurality of spiral guide vanes 44, each having an appropriate width, are formed on the internal surface of the tubular scraper integrally therewith. Formed on the periphery of the tubular scraper 43 is a ring gear 42, which is in mesh with pinions 41 and gear 40 which in turn are adapted to rotate under the drive of hydraulic motors 4. In this manner, the tubular scraper 43 is rotatable at appropriate speed on a number of idler rolls 45, which support the scraper.

Also, pinions 16 are arranged to be driven by hydraulic motors 4 to rotate through the reduction gear the rotary support mount 48 about the axis of the apparatus by way of an internal gear located in the frame 1a. The resulting rotation of the cutter teeth 47 on the segments 46, in cooperation with the advancing movement of the entire apparatus, is effective to form in the rock face an annular bore corresponding in radial width with the cutters.

It will readily be understood that the earth or rock fragments formed in such annular boring and those of the remaining core are carried rearwardly of the apparatus by rotation of the tubular scraper 43 which carries spiral guide vanes 44.

Although a few embodiments of the present invention have been shown and described herein, it will be apparent to those skilled in the art that various changes and modifications may be made therein without departing from the

What is claimed is:

1. An apparatus for excavating tunnels through rock comprising a first tubular frame including an annular tool support rotatably mounted thereon and carrying a plurality of rock cutters, means to rotatably drive the tool supports, a second tubular frame arranged concentrically around the outside of said first frame and including means for supporting the wall of the excavated tunnel and holding the second frame in relative position to the wall, and means for allowing a limited relative axial displacement therebetween without any relative rotation therebetween while still in concentric relation.

2. An apparatus for excavating tunnels comprising a first tubular frame including an annular rotatable support with a conical arrangement thereon of a plurality of cutter teeth and drive means for rotating said annular support about its axis, a second tubular frame arranged concentrically around the outside of said first frame and including means for supporting the wall of the excavated tunnel and maintaining the second frame in relative relation to the wall, means for displacing said first frame axially relative to said second frame while still in concentric relation, and a tubular scraper arranged inside said first frame for rotation along the inner wall thereof and carrying a plurality of spiral guide vanes.

3. In an apparatus for excavating tunnels the combination of
a first tubular frame,
an annular tool support rotatably mounted in concentric alignment on the first tubular frame,
a plurality of cutters rotatably mounted on the tool support to define an annular conical cutting surface of greater outer diameter and lesser inner diameter than the first tubular frame upon rotation of the tool support,
means to rotate said tool support about the first tubular frame,
a second tubular frame arranged concentrically outside said first tubular frame and slidable in telescopic relation therewith,
means operatively attached to said second tubular frame to fix said second tubular frame in position by engaging the walls within a tunnel being excavated, and
means to control the telescopic relation of the first tubular frame relative to the second tubular frame.

4. A combination according to claim 3 where roller means are provided around the periphery of the first tubular frame means, and including means for adjustably engaging the roller means with the walls of the tunnel being excavated to fix the first tubular frame means in slidable relation to the tunnel being excavated and allowing a tilting of the first tubular frame means relative to the tunnel being excavated to permit excavation of curved tunnels.

5. A combination according to claim 3 where pressure means operatively affixed to the first tubular frame adjustably enages the core formed by the excavation to effect breaking off thereof at the point of excavation, and where conveyor means are provided to remove the core from the apparatus and out the tunnel excavated.

6. A combination according to claim 3 where a tubular scraper is rotatably mounted concentrically within the first frame for rotation along the inner wall thereof, but which does not extend from the end of said first tubular frame as far as the cutters, and a plurality of guide vanes mounted in helical fashion on the radially inner surface of said tubular scraper to convey debris back rearwardly of the apparatus.

7. A combination according to claim 3 where a curved roof-like cover is provided in two parts, one attached to the first tubular frame and one to the second tubular frame to form a cover around the apparatus to protect against falling rock fragments and loose earth.

8. In an apparatus for excavating tunnels the combination of
a first tubular frame,
an annular tool support rotatably mounted in concentric alignment to one end of the first tubular frame,
a plurality of rock cutters rotatably mounted to the tool support to define an annular funnel shaped concentric grooved cutting surface of greater outer diameter and lesser inner diameter than the first tubular frame upon rotation of the tool support,
a plurality of scrapers mounted to the tool support to crush down and scrape out the lands between grooves upon rotation of the tool support,
means to rotate said tool support about the first tubular frame,
a second tubular frame arranged concentrically outside the first tubular frame and slidable in telescoping relation therewith,
means to fix the position of the second tubular frame relative to the tunnel being excavated, and
means to adjustably fix the relation of the first tubular frame relative to the second tubular frame.

9. In an apparatus for excavating tunnels the combination of
a first tubular frame,
an annular cylindrically shaped cutting tool support rotatably mounted in concentric alignment with the first tubular frame,
a plurality of cutters mounted on the tool support to define a cutting surface of greater outside diameter and lesser inner diameter than the first tubular frame upon rotation of the tool support,
a second concentric tubular frame arranged concentrically outside said first tubular frame and being adjustably slidable in telescopic relation therewith,
means to selectively fix the second tubular frame in relation to the walls of the tunnel being excavated, and
motor and gear means fixed to at least one of the tubular frames to effect rotation of the cutters about the first tubular frame, and piston means fixed to the second tubular frame and connected to the first tubular frame to control the telescopic relation of the first tubular frame to the second tubular frame during such rotation of the cutters.

10. An apparatus according to claim 9 where a motor means is mounted to the first tubular frame and drive through a gear chain to effect rotation of the cutting tool around the first tubular frame, and where the cutting tool defines an annular ring shaped path through the material being cut which allows both tubular frames to slide therein.

11. In an apparatus for excavating tunnels the combination of a first tubular frame, an annular tool support rotatably mounted in concentric alignment on the first tubular frame, a plurality of cutters rotatably mounted on the tool support to define an annular cutting surface of greater outer diameter and lesser inner diameter than the first tubular frame upon rotation of the tool support, means to rotate said tool support about the first tubular frame, a second tubular frame arranged concentrically outside said tubular frame and slidable in telescopic relationship therewith, and having an outer diameter of less than the outer diameter defined by the annular cutting surface, means operatively attached to said second tubular frame to fix said second tubular frame in position by engaging the walls within a tunnel being excavated, and means to control and limit the telescopic relation of the first tubular frame relative to the second tubular frame.

12. An apparatus for excavating tunnels according to claim 11 which includes means mounted to said first frame means adapted to engage the walls of the tunnel excavated to prevent the first frame means from rotational movement with respect to said walls of the tunnel, but not to prevent longitudinal sliding movement with respect to the walls of the tunnel.

References Cited

UNITED STATES PATENTS

| | | | |
|---|---|---|---|
| 874,603 | 12/1907 | Lee et al. | 299—31 |
| 2,919,121 | 12/1959 | Ruth | 175—76 X |
| 2,979,318 | 4/1961 | Haspert et al. | 299—15 |

FOREIGN PATENTS

| | | |
|---|---|---|
| 8,748 | 3/1901 | Great Britain. |
| 278,219 | 1/1952 | Switzerland. |

ERNEST R. PURSER, *Primary Examiner.*